March 5, 1968 R. J. CATANZARO 3,371,979
FLUID-FILLED VARIABLE DENSITY POLARIZING SUNGLASSES
Filed April 15, 1963 3 Sheets-Sheet 1

INVENTOR.
RONALD J. CATANZARO
BY
*Fay & Fay*
ATTORNEYS

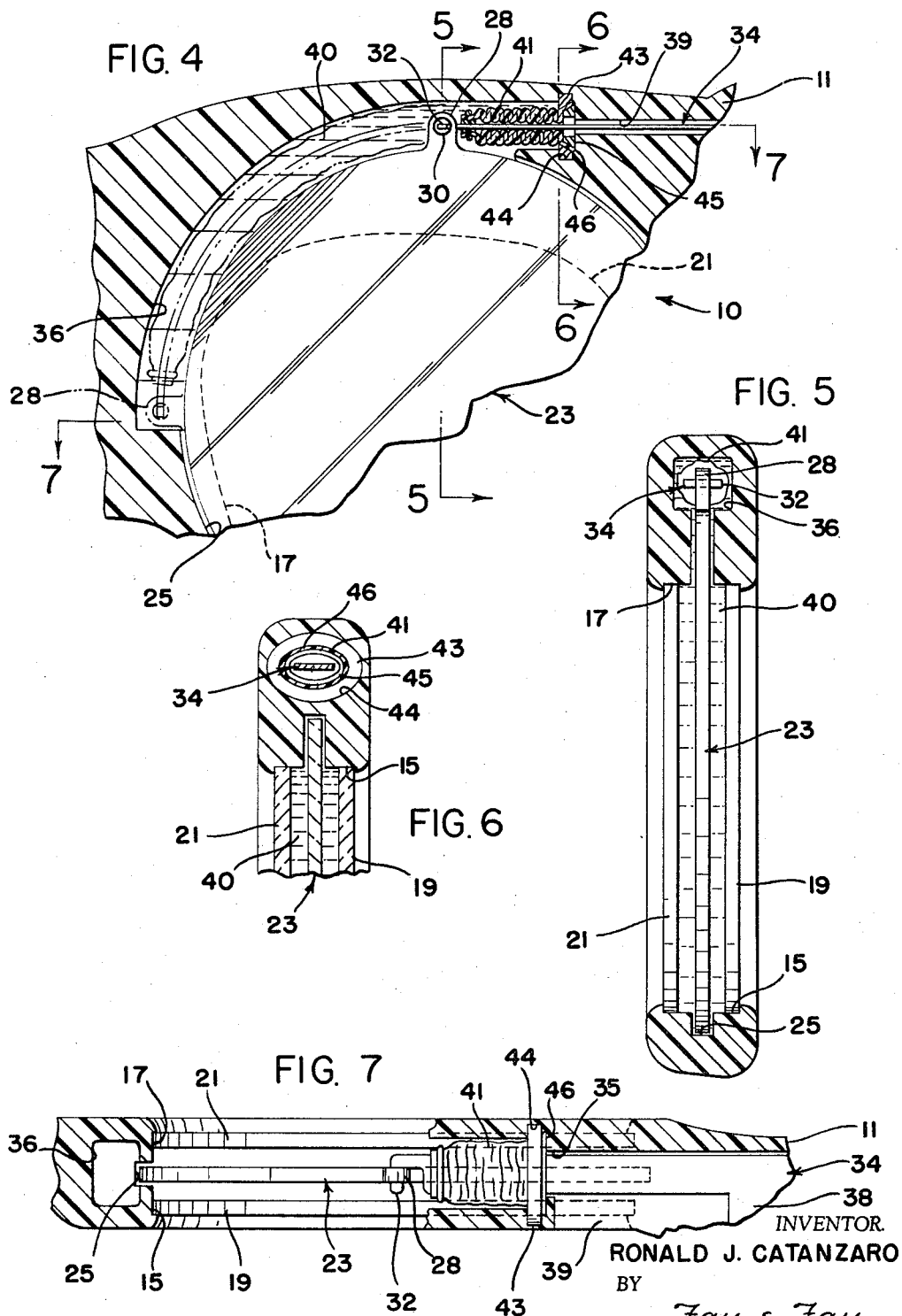

March 5, 1968 R. J. CATANZARO 3,371,979
FLUID-FILLED VARIABLE DENSITY POLARIZING SUNGLASSES
Filed April 15, 1963 3 Sheets-Sheet 3
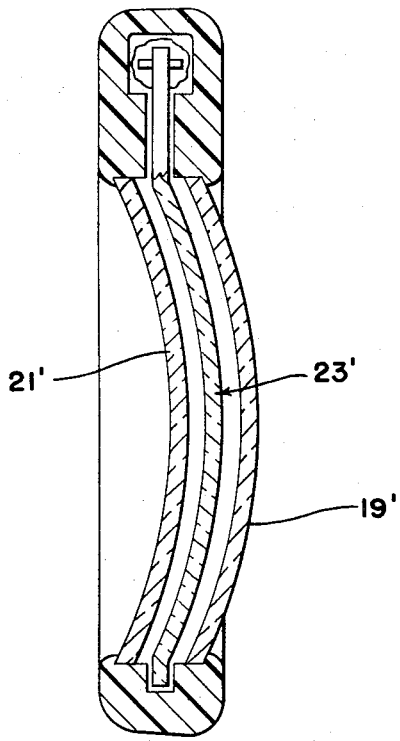
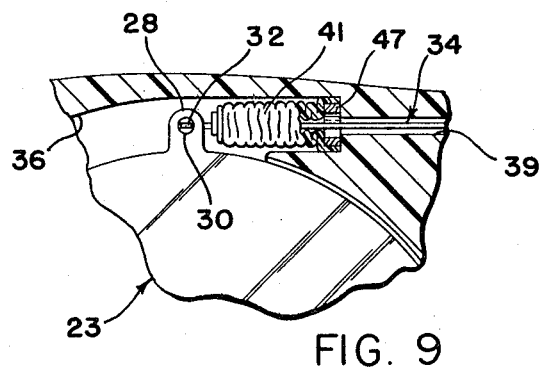
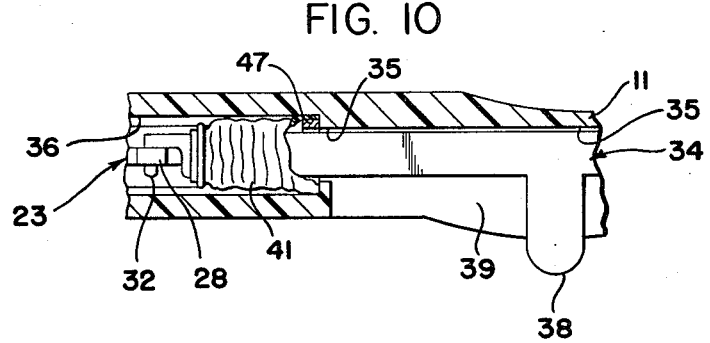
INVENTOR.
RONALD J. CATANZARO
BY
*Fay & Fay*
ATTORNEYS

United States Patent Office 3,371,979
Patented Mar. 5, 1968

3,371,979
FLUID-FILLED VARIABLE DENSITY
POLARIZING SUNGLASSES
Ronald J. Catanzaro, c/o William Beaumont General
Hospital, 7417-B Hume St., El Paso, Tex. 79930
Filed Apr. 15, 1963, Ser. No. 273,057
1 Claim. (Cl. 351—49)

This invention relates to light polarizing lenses and more particularly to polarizing lenses as used in variable density sunglasses.

Sunglasses are worn by multitudes of people during all seasons of the year. Thus, people not only have found it desirable to protect their eyes from the summer sun, but also sunglasses have been widely used as a means of protecting the eyes from the sun's reflected brilliance in snowy climes. Yet, a certain amount of inconvenience is attached to the wearing of sunglasses. Sunglasses which are adequate on normal sunny days fail to provide the comfort desired when on a sunny beach. Also, one who wears sunglasses must constantly remove them and then replace them as he passes from the sunlight into a building and back out into the sunlight. Aside from the obvious inconvenience, the frequent manipulation of the glasses has been the occasion of much loss and breakage.

Attempts have been made to remedy this problem. Using the known principles of polarization of light, sunglasses have been developed which contain adjustable polarizing lenses so that the density of light passing through the lenses may be varied. Although this arrangement has been satisfactory as a means of variably adjusting the intensity of light, the solution has in turn raised some problems. Thus, it has been necessary to place on the frames of the glasses a mechanism whereby the polarizing lenses may be rotated relative to each other. The result has been a bulky device that has been difficult for the wearer to operate and that has failed to appeal to the esthetic nature of the consuming public. Also, the utilization of two lenses separated by an air space causes the wearer to see a secondary image of various objects. These secondary images or shadows are extremely distressing to the wearer and probably have been the major cause why variable density sunglasses have not attained popular usage.

In view of the above problems, an object of this invention is to provide variable density sunglasses which are similar in appearance to conventional sunglasses.

A further object of this invention is to provide variable density sunglasses which are inexpensive to manufacture.

A still further object of this invention is to provide variable density sunglasses which provide a clear image for the wearer.

Another object of this invention is to provide variable density sunglasses which have a single, easily operated means for varying the light intensity passing through the glasses.

With the above objects in mind, one preferred embodiment of my invention contemplates a frame having a pair of light polarizing lenses in each of the right and left eye apertures. A fluid having an index of refraction closely approximating that of the lenses is disposed in a chamber between the two lenses. A flat spring steel actuator is disposed in a cavity in the upper portion of the frame with a tab extending outwardly of the cavity. Opposite ends of the actuator are secured to one of the lenses in each of the right and left eye apertures, whereby sliding movement of the actuator causes rotation of one of the lenses in each of the apertures. A bellows type seal is secured to either end of the actuator and serves to isolate the fluid chamber from the actuator containing cavity.

To the accomplishment of the foregoing and related ends, the following description sets forth in detail the invention as embodied in a pair of sunglasses. It is believed that it will be apparent to one having ordinary skill in that the principles herein disclosed readily may be adapted to other uses. Therefore, the disclosed embodiment is not meant to be limiting, constituting but one of the various ways in which the principles of the invention may be used.

In the drawings:

FIG. 4 is a broken away view in section showing more in detail the lens actuating mechanism.

FIG. 5 is a view taken along line 5—5 of FIG. 4.

FIG. 6 is a view taken along line 6—6 of FIG. 4.

FIG. 7 is a view taken along line 7—7 of FIG. 4.

FIG. 8 is a view similar to FIG. 5 showing a modification of the lenses.

FIG. 9 is a view similar to FIG. 4 showing a modified form of the sealing means for the lens actuating mechanism.

FIG. 10 is a planned view of the embodiment shown in FIG. 9.

Figure 1:
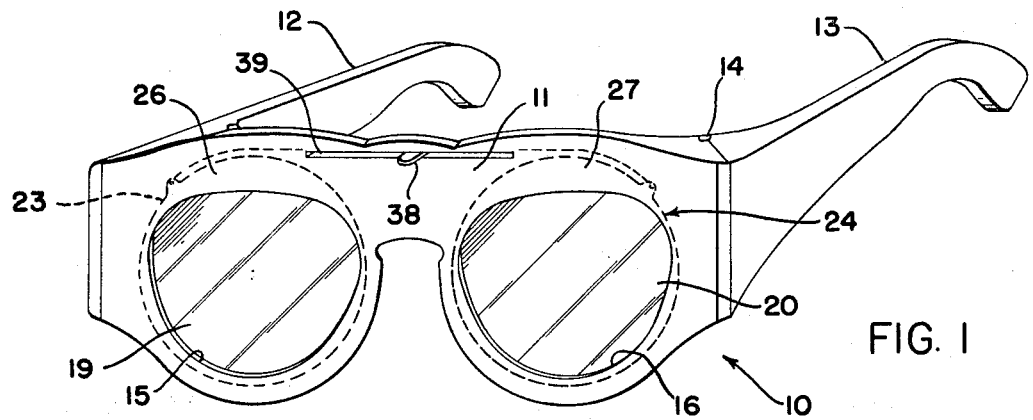
FIG. 1 is a perspective view of a pair of sunglasses embodying the instant invention.

Turning to FIG. 1, the invention is embodied in a pair of sunglasses indicated generally by the reference numeral 10. The sunglasses are comprised of a bridge portion 11 and temples 12 and 13. The temples are secured by hinges 14 to the side marginal portions of the glasses. Oval-shaped openings 15, 16 are provided in the forward wall of the bridge portion 11 and define right and left eye apertures. Similar oval-shaped openings 17, 18 are provided in the rear wall of the bridge portion.

Disposed in the forward openings 15, 16 are lenses 19, 20. Similarly secured in the rear openings 17, 18 are lenses 21, 22. The lenses secured in the front and rear openings are nonrotatably mounted and serve to provide an airtight chamber therebetween.

Placed between the front and rear lenses of each eye aperture are rotatable lenses 23, 24. Each of the lenses 23, 24 is mounted in a groove 25 as shown for example in FIG. 5. The rotatable lenses 23, 24 are circular and are of a greater diameter than the oval openings so that the rotatable lenses are secured in position by both the groove 25 and the overlapping portions of the frames 26, 27 as shown in FIG. 1.

The front lenses 19, 20 are polarized in the same plane, that is, either horizontal or vertical. The stationary rear lenses 21, 22 are of a clear plastic material and have the sole function of providing an airtight rear wall for the lens cavity. Both of the rotatable lenses 23, 24 are polarized so that upon rotation of the rotatable lenses relative to the forward stationary lenses the intensity of light passing through the combination of the two polarized lenses may be varied.

In order to accomplish the rotation of the rotatable lenses, relative to the stationary lenses, each of the lenses 23, 24 is provided with tabs 28, 29 respectively. The tab on one of the rotatable lenses, for example lens 23, is positioned parallel to the axis of polarization of that lens while the tab on the rotatable lens 24 is at right angle with the axis of polarization of that lens. Each of the tabs 28, 29 has a hole 30, 31 passing there through.

Figure 2:
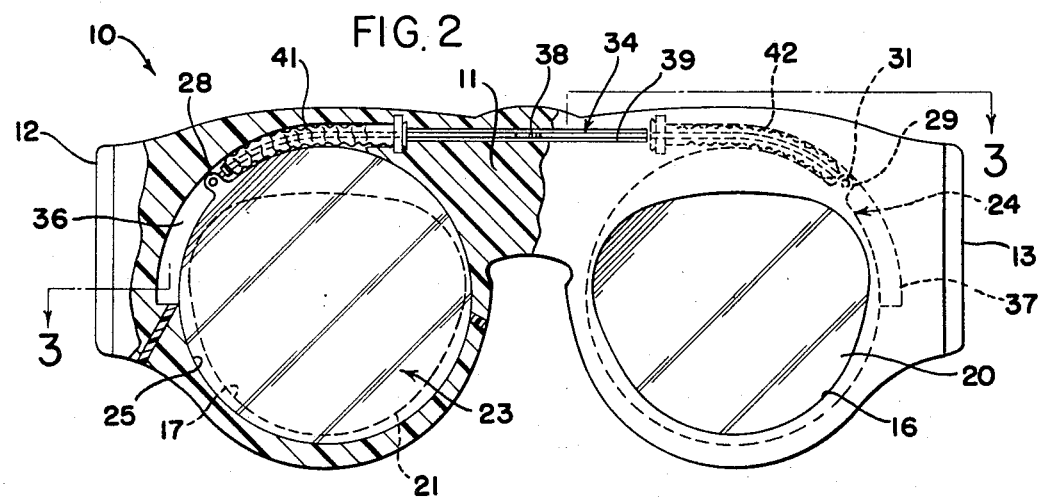
FIG. 2 is an elevational view partly in section showing the actuating mechanism for rotating the lenses.
Figure 3:
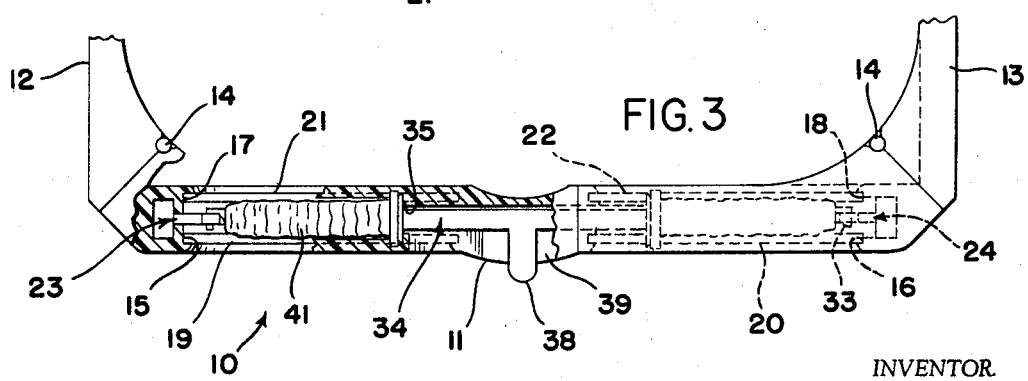
FIG. 3 is a view taken along line 3—3 of FIG. 2.

Received in the hole in each of the tabs 28, 29 is a projecting tang 32, 33 respectively. Tangs 32, 33 comprise opposite ends of an actuator 34 made of flat, flexible, spring steel. As it appears in FIG. 3 the actuator 34 is received in an actuator tunnel 35 which extends longitudinally of the bridge portion 11. The tunnel 35 opens at either end into recesses 36, 37 which are provided adjacent to each lens cavity so as to accommodate the tabs 28, 29 on the rotatable lenses as the rotatable lenses are moved. As it appears in FIG. 2 the recesses 36, 37 extend over an arc of 90°.

The actuator 34 includes an actuator tab 38 which protrudes from a slot 39 in the bridge portion 11 of the glasses. By virtue of the actuator tab 38, a wearer of the glasses, by displacing the tab 38 along the slot 39, may rotate the rotatable lenses to thereby vary the intensity of light passing through the combination of the polarized fixed lens and the polarized rotatable lens.

As it has been pointed out above, the provision of a lens separated by an air space from a second lens causes the wearer to receive shadowy images of objects viewed through the two lenses. This is due to the different index of refraction for air as compared to the index of refraction for the lens material. In order to alleviate this problem, an optic fluid is placed in the lens cavity, the fluid being designated by the reference numeral 40. The fluid should be of low viscosity, optically clear, noncorrosive to any of the elements which house it including lenses, frame, plastic tubing, and cement used to hold the parts together. Most important of all, however, is the requirement that the optic fluid should have an index of refraction that is as close as possible to the index of refraction of the lenses. It has been found that a decided improvement over prior variable density sunglasses may be obtained by using any liquid that has an index of refraction more nearly approximating that of the lenses than of air. However, optimum results are obtained when the fluid used has substantially the same index of refraction as the lenses so that the light impinging on the lenses will traverse the entire optic system as though it were passing through an optically homogenous material and thereby prevent the reception by the viewer of shadowy images.

One specific lens-fluid combination that has been found satisfactory is lenses composed of a cellulose acetate plastic having an index of refraction ranging from 1.27 to 1.32 and Dow Corning silicone fluid 200 having an index of refraction of 1.4. Another suitable fluid is Dow Corning fluid 182. Both of these fluids not only are optically satisfactory but also have desirable lubricating attributes and are not destructive of the other parts of the glasses.

Inasmuch as there is a fluid contained in the lens cavity, it is necessary to seal the lens cavity from the actuator tunnel 35 and the actuator tab slot 39. To accomplish this, each end of the actuator 34 is provided with a thin, extensible plastic tubing 41, 42 respectively. As shown for example in FIG. 4, the end of the tubing 41 nearest the tang 32 is secured to the actuator 34 by an airtight joint. The method of fastening may be by thread or wire wrapped around the tubing numerous times and cemented in place or any other applicable method.

The other end of the tubing 41 is secured to the frame of the glasses. This is accomplished by a large oval ring 43 which is received in a recess 44 in the bridge portion 11. The inner surface of the oval ring 43 is beveled and cooperates with a corresponding beveled surface on a smaller oval ring 45. Received between the cooperating beveled surfaces of the rings 43, 45 is an end 46 of the tubing 41. The combination of the rings 43, 45 and the tubing 41 is cemented together and provides an airtight sleeve assembly thereby to prevent escape of optic fluid from the lens cavity through the actuator tunnel.

Two purposes are accomplished by the sleeve assembly shown. First, and most obvious, the sleeve serves to seal the lens cavity and yet allow the actuator 34 to rotate the rotatable lenses. Secondly, the sleeve assures that the pressure of the fluid in the lens cavity will remain at atmospheric pressure. This is accomplished by virtue of the fact that the interior of the sleeve 41 is in communication with the atmosphere through the actuator tunnel 35 and the tab slot 39. Should the pressure within the lens cavity begin to exceed that of atmospheric pressure, the thin flexible sleeve 41 would be compressed and thereby compensate for the increase in pressure in the cavity. This is of considerable importance since, if a compensating device were not utilized, any increase in the pressure in the lens cavity would tend to distort the lenses and would cause a distortion of objects seen through the lenses.

The mode of operation of the glasses is believed to be obvious; however, a brief statement concerning the same may be helpful. A wearer of the glasses would merely adjust the actuator tab 38 along the slot 39 until the desired intensity of light passing through the lenses would be reached. This is accomplished by virtue of the rotation of the axis of polarization for the rotatable lens relative to the axis of polarization for the fixed lens. As the respective axes are rotated, the intensity of light passing through the lenses will be varied accordingly.

Returning to FIG. 1, it should be noted that the portions of the frames adjacent to the hinges 14 are thickened to approximate the curvature of the wearer's head. This is designed to eliminate as much as possible the intrusion of light from behind the glasses resulting in reflection from the rear lenses into the wearer's eyes. An additional technique might be utilized to eliminate the problem of reflected light from the rear lens. Such a technique is shown in the alternative embodiment illustrated in FIG. 8 where each of the lenses are curved thus providing a rear lens surface that is less effective for the reflection of light than a flat surface. Lens 19' corresponds to lens 19 in FIG. 5, with the exception of the curved configuration. Similarly, lenses 21' and 23' correspond to lenses 21 and 23. Obviously, the amount of curvature is not critical and may be varied considerably from the embodiments shown. If desired, the anterior and posterior lenses may be of different curvatures in respect to each other and thereby correct optical defects in the viewer's eyes.

Turning to FIG. 9, there is illustrated an embodiment essentially the same as those shown in the previous figures with the exception that the sealing means for the actuator assembly has been modified. Thus, rather than using a duality of oval rings with cooperating beveled surfaces, a single ring 47 is used and the end of the tubing 41 is secured between the ring 47 and the frame of the glasses. It might also be mentioned that the particular sealing arrangement for the actuator 34 might be simply an O-ring embedded in the housing with the actuator tab 34 passing through the O-ring. The problem with such an arrangement is that there is no compensating provision to accommodate the possible variation in fluid pressure in the lens cavity. However, compensating means in the form of a pressure chamber might be used in conjunction with the O-ring seal. The pressure chamber might take the form of a cavity in the glasses' frame in communication with the fluid chamber and with a flexible diaphragm forming one wall of the cavity. This arrangement would provide an expansible chamber capable of maintaining the pressure in the fluid chamber at the level of atmospheric pressure.

It is believed obvious that the principles of the invention may be utilized in devices other than sunglasses. Thus, the invention might be used in telescopes, or binoculars, or photographic equipment as well as such things as ship's portholes or similar structures in buildings, airplanes, trains, and the like.

Nor should the principles of the invention be restricted to the particular type of sunglasses illustrated. In its broadest aspect, the invention resides in the interposition of a fluid between two polarizing lenses, with the fluid and lenses having similar indices of refraction. Thus, although a third rear lens has been illustrated, its sole function is to aid in defining a chamber for the fluid. This function might be accomplished by the polarizing lenses themselves, thus rendering the third lens unnecessary.

Although but a few embodiments and alternatives have been illustrated and discussed, it is not my desire to be limited by such embodiments and alternatives inasmuch as other modifications will be readily apparent to one having ordinary skill in the art. It is therefore my desire to be limited only by the scope of the appended claim.

What is claimed is:

1. A variable density sunglass comprising a frame providing right and left eye apertures and including a bridge portion, a first light polarizing lens fixedly secured in each of said apertures, a second light polarizing lens rotatably mounted in each of said apertures and spaced from said first lens, a third lens fixedly secured in each of said apertures on the side of said second lens opposite to said first lens, said lenses having identical indices of refraction, adjustable means mounted in said bridge portion of said frame and being operably connected to said second lens, whereby said second lens may be rotated relative to said first and third lens, said first and third lenses with said frame defining a chamber, fluid means disposed in said chamber and immersing said second lens, said fluid having a refractive index closely approximating the refractive indices of said lenses, said bridge portion including a cavity in communication with said fluid chambers, said adjustable means comprising an elongated member longitudinally slidably disposed in the cavity in said bridge portion of said frame, said member having end portions extending into said fluid chamber in each of said right and left apertures, means securing each of said end portions respectively to one of said second lenses, sealing means secured to said elongated member and said frame whereby the cavity in said bridge portion is isolated from said fluid chambers, said sealing means comprising an extensible flexible tubular seal in each of said fluid chambers and surrounding a portion of said end portions of said member, each of said seals having one end secured to said member and the other end secured to said frame adjacent to the juncture of said cavity and said chambers whereby the interior of said tubular seals is in communication with said cavity and the exterior of said tubular seals is exposed to the fluid in said chambers.

References Cited

UNITED STATES PATENTS

| | | | |
|---|---|---|---|
| 2,380,481 | 7/1945 | Tillyer et al. | 351—49 |
| 2,813,459 | 11/1957 | Archambault | 351—49 |
| 3,198,070 | 8/1965 | Platzer et al. | 88—77 |

FOREIGN PATENTS

| | | |
|---|---|---|
| 532,690 | 1/1941 | Great Britain. |
| 984,277 | 2/1951 | France. |
| 510,245 | 1/1955 | Italy. |

DAVID H. RUBIN, *Primary Examiner.*